(12) United States Patent
Hardacker et al.

(10) Patent No.: US 7,768,472 B2
(45) Date of Patent: Aug. 3, 2010

(54) UNOBSTRUSIVE PLACEMENT OF WIRELESS ANTENNA FOR CE DEVICES

(75) Inventors: Robert L. Hardacker, Escondido, CA (US); James R. Milne, Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 12/075,972

(22) Filed: Mar. 14, 2008

(65) Prior Publication Data
US 2009/0231212 A1 Sep. 17, 2009

(51) Int. Cl.
*H01Q 1/12* (2006.01)
(52) U.S. Cl. .................................. 343/878; 343/872
(58) Field of Classification Search ................. 343/872, 343/702, 878
See application file for complete search history.

(56) References Cited

U.S. PATENT DOCUMENTS

| | | | |
|---|---|---|---|
| 6,977,808 B2 * | 12/2005 | Lam et al. .............. | 361/679.24 |
| 7,440,264 B2 * | 10/2008 | Lam et al. .............. | 361/679.27 |
| 7,460,362 B2 * | 12/2008 | Lam et al. .............. | 361/679.27 |
| 2004/0164911 A1 * | 8/2004 | Sun et al. ..................... | 343/702 |
| 2006/0268184 A1 * | 11/2006 | Kim et al. ................... | 348/836 |
| 2007/0063864 A1 * | 3/2007 | Flynn et al. ............ | 340/825.69 |
| 2007/0252699 A1 * | 11/2007 | Homer et al. ............ | 340/572.7 |

\* cited by examiner

*Primary Examiner*—Hoang V Nguyen
(74) *Attorney, Agent, or Firm*—Blakely, Sokoloff, Taylor & Zafman LLP

(57) ABSTRACT

An embodiment of the present invention includes a technique to attach a wireless antenna to a consumer electronics (CE) device. A removable bezel holds a display assembly of the CE device. An antenna attachment mechanism integrated to the removable bezel at a pre-determined location to allow connection to a radio frequency (RF) communication circuit internal to the CE device. The antenna attachment mechanism is adapted for attachment to a wireless antenna used in a wireless transmission. In another embodiment, a wireless antenna is integrated within the removable bezel at a pre-determined location. The wireless antenna is coupled to the RF communication circuit for a wireless transmission. In yet another embodiment, an antenna assembly is attached to the removable bezel at a pre-determined location. The antenna assembly has a wireless antenna coupled to the RF communication circuit for a wireless transmission.

37 Claims, 8 Drawing Sheets

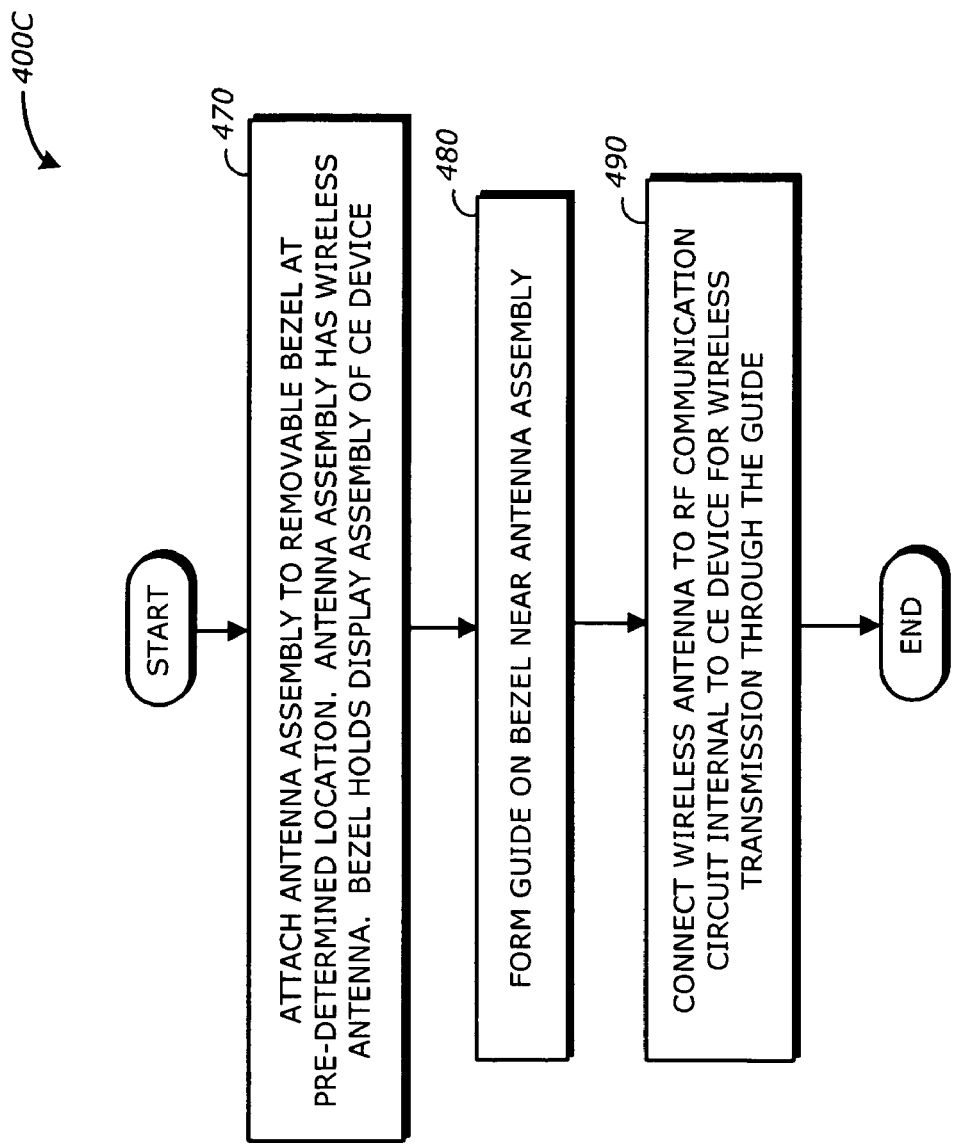

UNOBTRUSIVE PLACEMENT OF WIRELESS ANTENNA FOR CE DEVICES

BACKGROUND

1. Field of the Invention

Embodiments of the invention relate to the field of consumer electronics (CE), and more specifically, to wireless antennae for CE devices.

2. Description of Related Art

More and more CE devices (e.g., flat panel televisions, multimedia devices) are adding wireless capabilities. However, addition of wireless antennae to these devices has been a challenge because of conflicting requirements regarding their physical placement. First, the wireless antennae have to be placed at a location so that they do not cause an unpleasant viewing experience. In other words, they are preferably invisible to the user. Second, the wireless antennae should not be blocked or shielded from receiving radio frequency (RF) signals generated from a wireless transmitter device or a remote control device.

Existing techniques to add wireless antennae to CE devices have a number of drawbacks. One technique attaches the wireless antennae along the top of the CE device. This technique causes distraction to the viewer or reduces the aesthetic value of the CE device. Another technique places the wireless antennae behind the CE device. This technique effectively shields RF reception from across the room due to the large quantity of metal shielding within the CE device. Another technique builds the wireless antennae directly into the CE device such as an integral part of the device frame. This technique adds manufacturing costs to the CE devices where customers may not want to opt for wireless capabilities.

BRIEF DESCRIPTION OF THE DRAWINGS

Embodiments of the invention may best be understood by referring to the following description and accompanying drawings that are used to illustrate embodiments of the invention. In the drawings:

FIG. 4C is a flowchart illustrating a process to form a bezel assembly with an antenna assembly according to one embodiment of the invention.

DESCRIPTION

Figure 1:
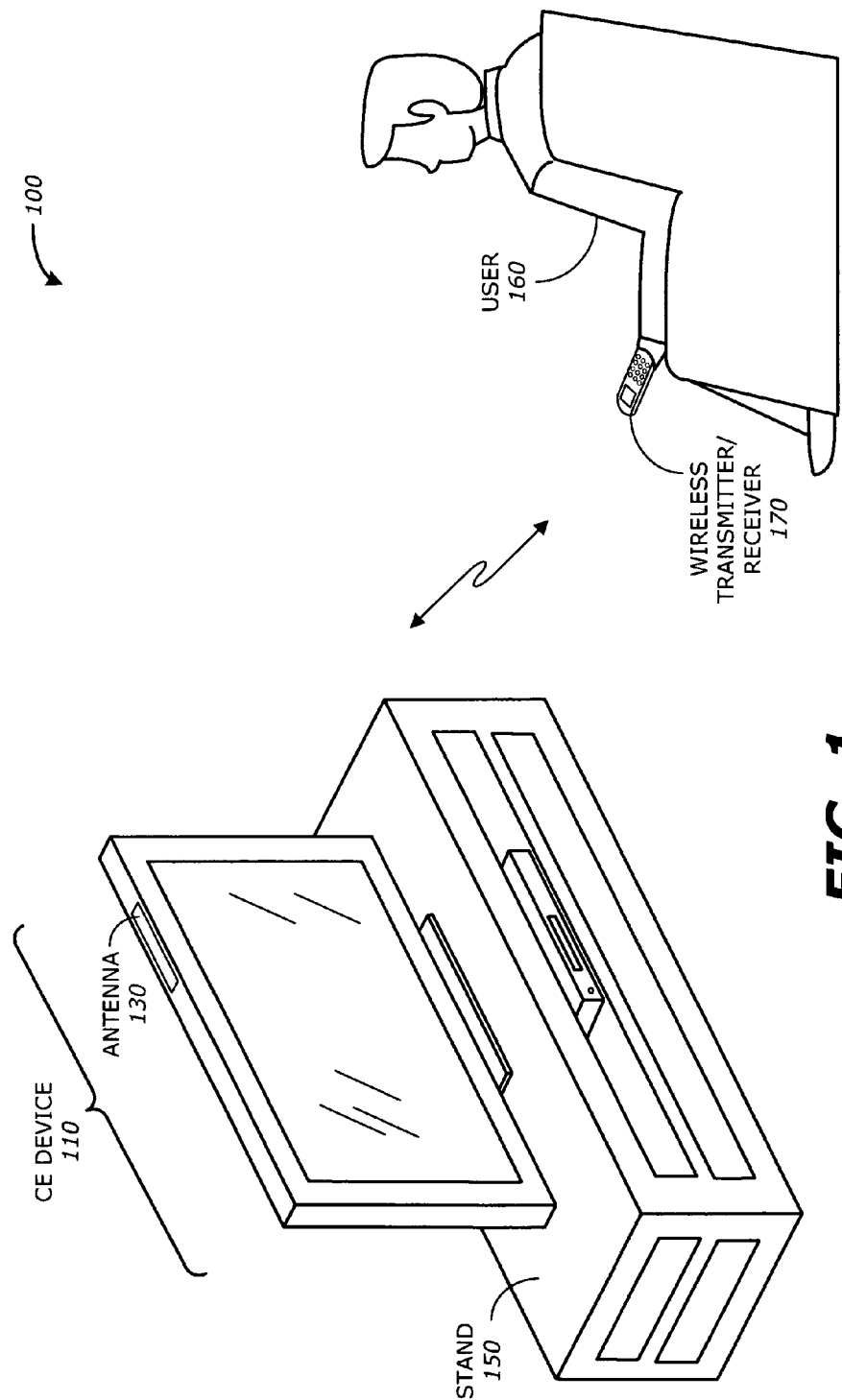
FIG. 1 is a diagram illustrating a system according to one embodiment of the invention.

An embodiment of the present invention includes a technique to attach a wireless antenna to a consumer electronics (CE) device. A removable bezel secures a display assembly of the CE device. An antenna attachment mechanism integrated to the removable bezel at a pre-determined location to allow connection to a radio frequency (RF) communication circuit internal to the CE device. The antenna attachment mechanism is adapted for attachment to a wireless antenna used in a wireless transmission. In another embodiment, a wireless antenna is integrated within the removable bezel at a pre-determined location. The wireless antenna is coupled to the RF communication circuit for a wireless transmission. In yet another embodiment, an antenna assembly is attached to the removable bezel at a pre-determined location. The antenna assembly has a wireless antenna coupled to the RF communication circuit for a wireless transmission.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Embodiments of the invention include a technique to add a wireless antenna to a CE device (e.g., a flat panel display television) in an unobtrusive manner. The wireless antenna may be attached to a bezel assembly of the CE device. The bezel assembly includes a removable bezel that has an antenna attachment mechanism. The antenna attachment mechanism is integrated to the removable bezel at a pre-determined location to allow connection to a RF communication circuit internal to the CE device. The antenna attachment mechanism is adapted for attachment to a wireless antenna used in a wireless transmission. The wireless transmission is one of RF, sonic (e.g., ultrasound), and optical (e.g., infrared). For RF transmission, it is compatible to one of Institute Electronics and Electrical Engineers (IEEE) 802.11a, 802.11b, 802.11g, 802.11j, 802.11n, ultra wideband (UWB), or millimeter wave standards.

The antenna attachment mechanism on the removable bezel provides a number of benefits. In general, the pre-determined location is selected to provide the necessary shielding from RF signals emanated from the circuits inside the CE device. Thus, the wireless transmission is not subject to electromagnetic interference (EMI) from the CE device. In addition, the bezel is transparent to all the wireless technologies leading to clear reception of wireless signals. Furthermore, the wireless antenna is embedded in the bezel to maintain the aesthetic value of the CE device.

FIG. 1 is a diagram illustrating a system 100 according to one embodiment of the invention. The system 100 includes a CE device 110, a stand 150, a user 160, and a wireless transmitter/receiver 170. The system 100 may represent a home or office environment.

The CE device 110 is any device that may have a display screen enclosed in a bezel and may have wireless capabilities. Examples of the CE device 110 include a display device capable of rendering audio-visual data, video, or graphics, a television, a liquid crystal display (LCD) device, a flat panel display device, a computing device, a game console, a home entertainment device, and a multimedia device. In one embodiment, the CE device 110 is a LCD flat panel television with a high definition television (HDTV) display. It may have high definition multimedia interface (HDMI) and digital audio-visual transmission. It may have a wireless antenna 130 attached to the front to provide wireless connectivity. There may be more than one antenna attached to the CE device 110.

The wireless antenna 130 may be attached to the CE device 110 at a location that is optimal for wireless transmission/reception. The wireless antenna 130 may be of any type such as directional antennae and omni-directional antennae. It may have any suitable size and physical appearance. As will be described later, the CE device 110 has a bezel assembly that is used to provides an attachment mechanism to attach the antenna 130 in such a way that the antenna 130 may be hidden within the bezel assembly while still provides clear reception of wireless signals. In another embodiment, the wireless antenna 130 may be included in an antenna assembly which may be a part of the bezel assembly or added to the bezel assembly. The antenna assembly may include a circuit board that has the wireless antenna 130 and associated circuitry to communicate with the RF communication circuit in the CE device 110. In yet another embodiment, the wireless antenna 130 may be integrated within the bezel assembly as part of the bezel assembly itself.

The stand 150 provides support for the CE device 110. It may house other accessories such as recording device, speakers, etc. for a home entertainment system. It may also have HDMI connectivity with automatic detection of optimal video and audio signals from all connected components a simple one wire connection.

The user 160 may use the wireless transmitter/receiver 170 to interact with the CE device 110. The wireless transmitter/receiver 170 may be any transmitter or receiver or both that send or transmit wireless signals to or from the CE device 110. The wireless transmission may utilize any wireless technologies such as RF transmission. The wireless transmitter/receiver 170 may be a remote control unit, a game controller (e.g., gamepad, joystick, paddle, light guns), another CE device, a computing unit, or any input or output device that may have wireless capabilities. The user 160 and the wireless transmitter/receiver 170 may be located near the CE device 110 such as in the same room; or they may be separated from the CE device 110 by a separator such as a wall or office divider.

Figure 2:
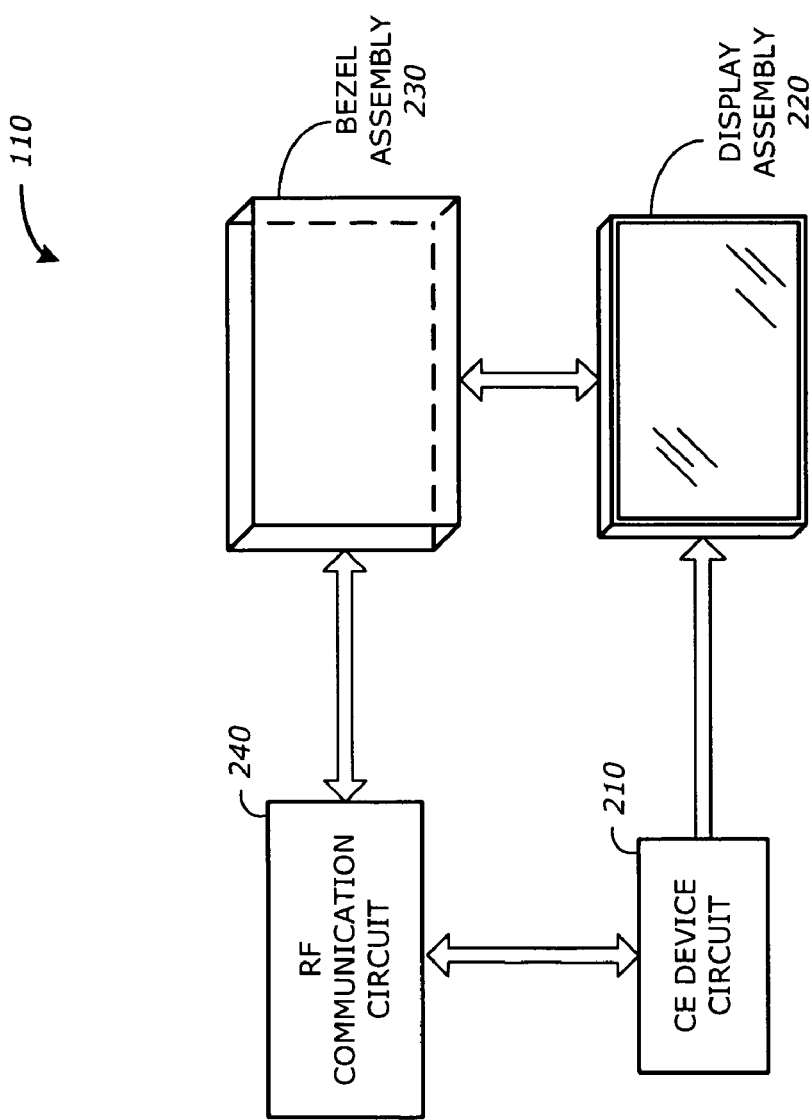
FIG. 2 is a diagram illustrating a CE device according to one embodiment of the invention.

FIG. 2 is a diagram illustrating the CE device 110 shown in FIG. 1 according to one embodiment of the invention. The CE device 110 includes a CE device circuit 210, a display assembly 220, a bezel assembly 230, and a RF communication circuit 240.

The CE device circuit 210 is a circuit that represents the core circuit for the CE device 110. It may include a central processor unit (CPU), associated memories including system memory, cache, flash memory, or mass storage device. It may also include signal processing circuits, filters, amplifiers, display drivers, and other circuits typically used in a television.

The display assembly 220 includes a display screen and a frame. The display screen may be a flat panel such as LCD, Liquid Crystal on Silicon (LCOS), plasma display, organic light-emitting diode display (OLED), light emitting diode (LED), electroluminescent display (ELD), etc. The frame may be attached around the periphery of the display screen and may be made of plastic or any other suitable material.

The bezel assembly 230 houses the display assembly 220 to provide mechanical support for the display assembly 220. It may have fasteners (e.g., screws) to attach to the display assembly 220. The fasteners may be located around the periphery of the display assembly 220 at locations to provide mechanical stability to the display assembly 220. The display assembly 220 may be inserted into the bezel assembly 230 and fastened to the bezel assembly 230 via the fasteners. After installation, the bezel assembly 220 may be easily removed from the display assembly 220 by the user. The bezel assembly 220 may have a pre-determined location at which the wireless antenna 130 may be attached.

The manufacturer of the CE device 110 may ship the unit in one of two configurations. The first configuration includes the bezel assembly 230 as part of the unit. The second configuration provides the bezel assembly 230 as a separate component. In the first configuration, the user has the option to keep the bezel assembly 230 as shipped, or to remove it if so desired. The user may remove the bezel assembly 230 by removing all the fasteners that fasten the bezel assembly 230 to the display assembly 220. In the second configuration, the user has the option to leave the bezel assembly 230 separate, or install the bezel assembly 230 into the CE device 110. The user may install the bezel assembly 230 by fastening all the fasteners to the display assembly 220. In either of the configurations, the user has the flexibility of using the bezel assembly 230 or not. The user may also have the flexibility to replace the bezel assembly 230 with any other compatible mounting device.

The RF communication circuit 240 includes circuits that support wireless connectivity to the CE device 110. It may include circuits that support various wireless communication standards such as IEEE 802.11 a/b/gn, UWB, and millimeter wave. It is contemplated that any other wireless communication technologies may be used. It may include modulation circuits to support various modulation types such as quadrature phase shift keying (QPSK), binary phase shift keying (BPSK), complementary code keying (CCK), and orthogonal frequency division multiplexing (OFDM). The RF communication circuit 240 is connected to the antenna 130 via cables.

Figure 3A:
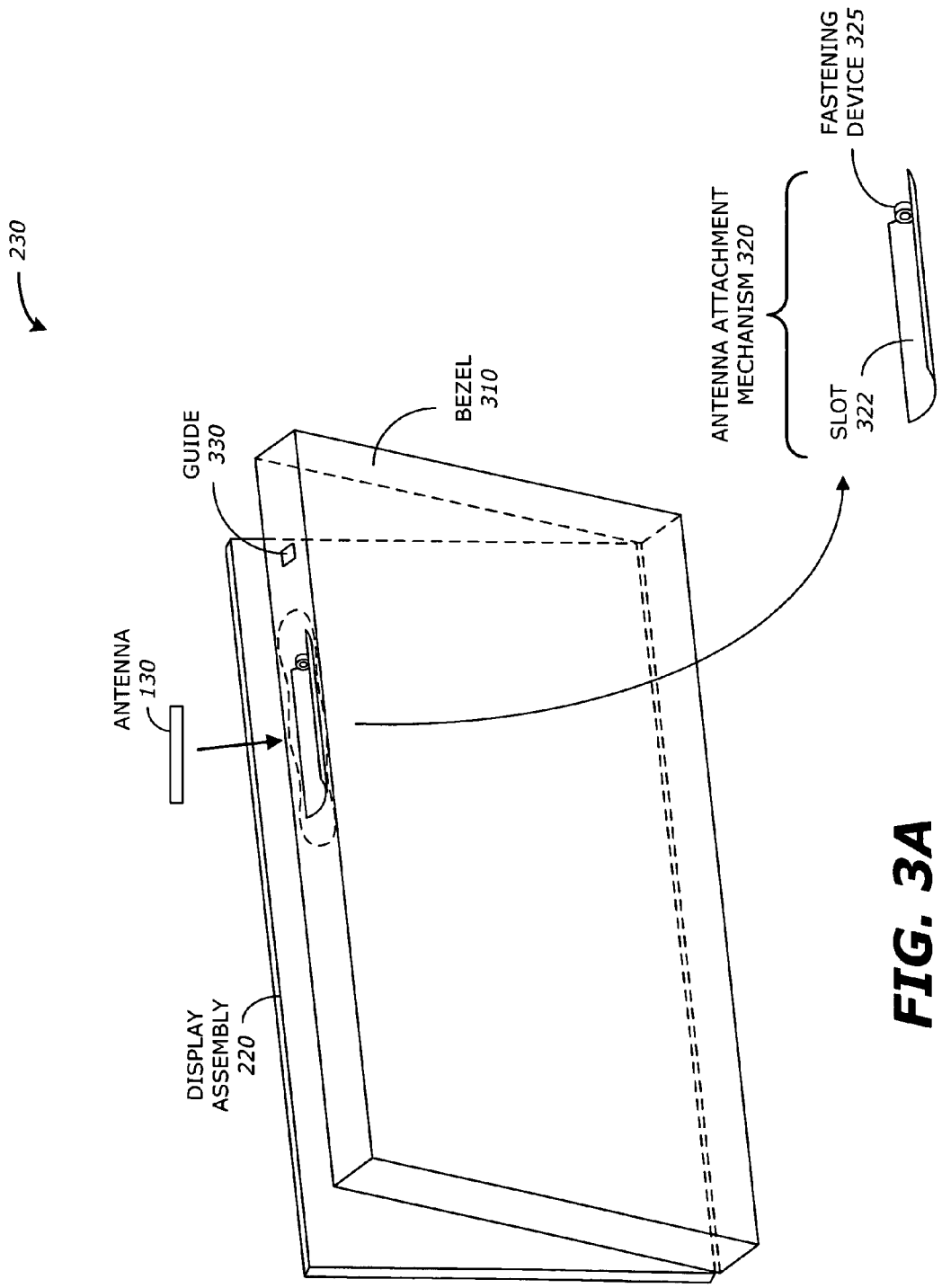
FIG. 3A is a diagram illustrating a bezel assembly with antenna attachment mechanism according to one embodiment of the invention.

FIG. 3A is a diagram illustrating the bezel assembly 230 shown in FIG. 2 with antenna attachment mechanism according to one embodiment of the invention. The bezel assembly 230 includes a removable bezel 310 and an antenna attachment mechanism 320.

The removable bezel 310 secures the display assembly 220 (FIG. 2) of the CE device 110 (FIG. 1). It holds the display assembly 220 and provides mechanical support and stability to the display assembly 220. It may be easily removed from the display assembly 220 and replaced by other bezels. In another embodiment, the display assembly 220 may be firmly secured within the CE device 110 without the removable bezel 310 and the removable bezel 310 may be used to add to the aesthetic value of the CE device 110. The use of the removable bezel 310 is therefore optional to the user. The bezel 310 may be made by plastic or any other materials that can effectively shield the EMI generated from the electronic components in the CE device 110.

The removable bezel 310 may have a guide 330 to guide interconnection cables or wires from the antenna to the circuitry internal to the CE. The guide 330 may be a hook, a loop, or any device that may be attached to, or integral to, the bezel 310 to guide or route the cable or wire in such a way that the cable or wire is not visible to the viewer. It may be a guide to allow cables or wires to go through. This guide 330 may be a hole or a narrow slit that is sized to accommodate the cables or wires. The cables or wires are used to connect the wireless antenna 130 to the RF communication circuit 240 (FIG. 2) inside the CE device 110. The guide 330 may not be needed if there is an existing way to run the cable or wire to the circuit.

The antenna attachment mechanism 320 may be integrated to the removable bezel 310 at a pre-determined location. This pre-determined location may be near to the guide 330 to allow connection to the RF communication circuit 240 internal to the CE device 110. The antenna attachment mechanism 320 may be adapted for attachment to the wireless antenna 130 used in a wireless transmission.

The construction of the antenna attachment mechanism 320 depends on the particular design of the CE device 110. The antenna attachment mechanism 320 may be designed to have the following features: (1) it reduces electromagnetic interferences generated from the CE device 110; (2) it maintains an aesthetic and pleasing view; (3) it is convenient and easy to use; and (4) it can accommodate a wide variety of wireless antennae or a specific type of antennae with a compatible size and physical appearance. The pre-determined location on the removable bezel therefore is selected according to the characteristics of the CE device 110 and the desired wireless transmission characteristics. It may be on top, underside, or along the vertical side of the bezel 310. It is contemplated that the pre-determined location may be at any location that provides the optimal combination of two features: clear signal reception and maintaining aesthetic value to the CE device.

The antenna attachment mechanism 320 may include a slot 322 shaped to accommodate the wireless antenna and a fastening device 325 secured to the pre-determined location in the slot to attach to the wireless antenna. The bezel 310 may be molded to provide the slot and accommodate the antenna shape and attachment characteristics. The slot 322 may have a curved surface so that the antenna may not be visible.

The fastening device 325 is secured to the pre-determined location to provide connection to the wireless antenna 130. It may be a clip, a receptacle, a connector, a socket, or a mounting bracket that is designed to fit to the wireless antenna 130 depending on the connection design of the antenna 130. The fastening device 325 firmly holds the antenna 130 in the slot 322. The fastening device 325 may be designed to provide a snap-in action when the antenna is attached to the bezel 310. This fastening device 325 may be located near the guide 330 so that the antenna cable may be run through the guide to connect to the RF communication circuit 240 inside the CE device 110.

Figure 3B:
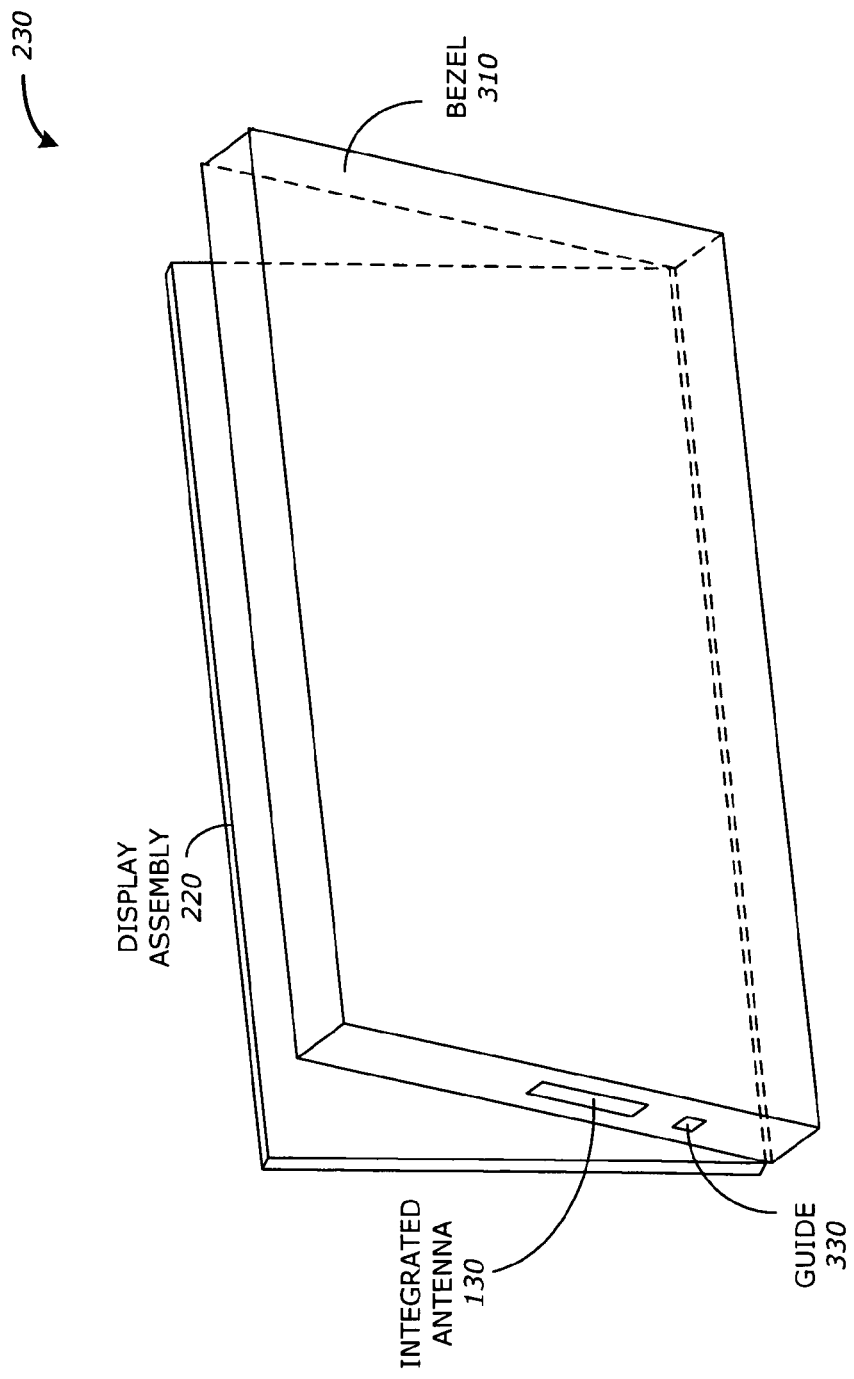
FIG. 3B is a diagram illustrating a bezel assembly with an integrated antenna according to one embodiment of the invention.

FIG. 3B is a diagram illustrating the bezel assembly 230 shown in FIG. 2 with an integrated antenna according to one embodiment of the invention.

The bezel assembly 230 includes the removable bezel 310 as described in FIG. 3A. The removable bezel 310 includes an integrated antenna 130 and the guide 330. The integrated antenna 130 is embedded in the plastic of the removable bezel 310 at a pre-determined location. As discussed above, the pre-determined location may be at any location that provides the optimal combination of two features: clear signal reception and maintaining aesthetic value to the CE device. The integrated antenna 130 may be molded directly to, and is a part of the removable bezel 310. It may include one or more wires (e.g., copper wires) cut to a pre-determined length with appropriate orientation for each wire. The guide 330 guides or allows interconnection cables or wires to go through to connect the antenna to the RF communication circuit 240 (FIG. 2) inside the CE device 110 as described in FIG. 3A.

Figure 3C:
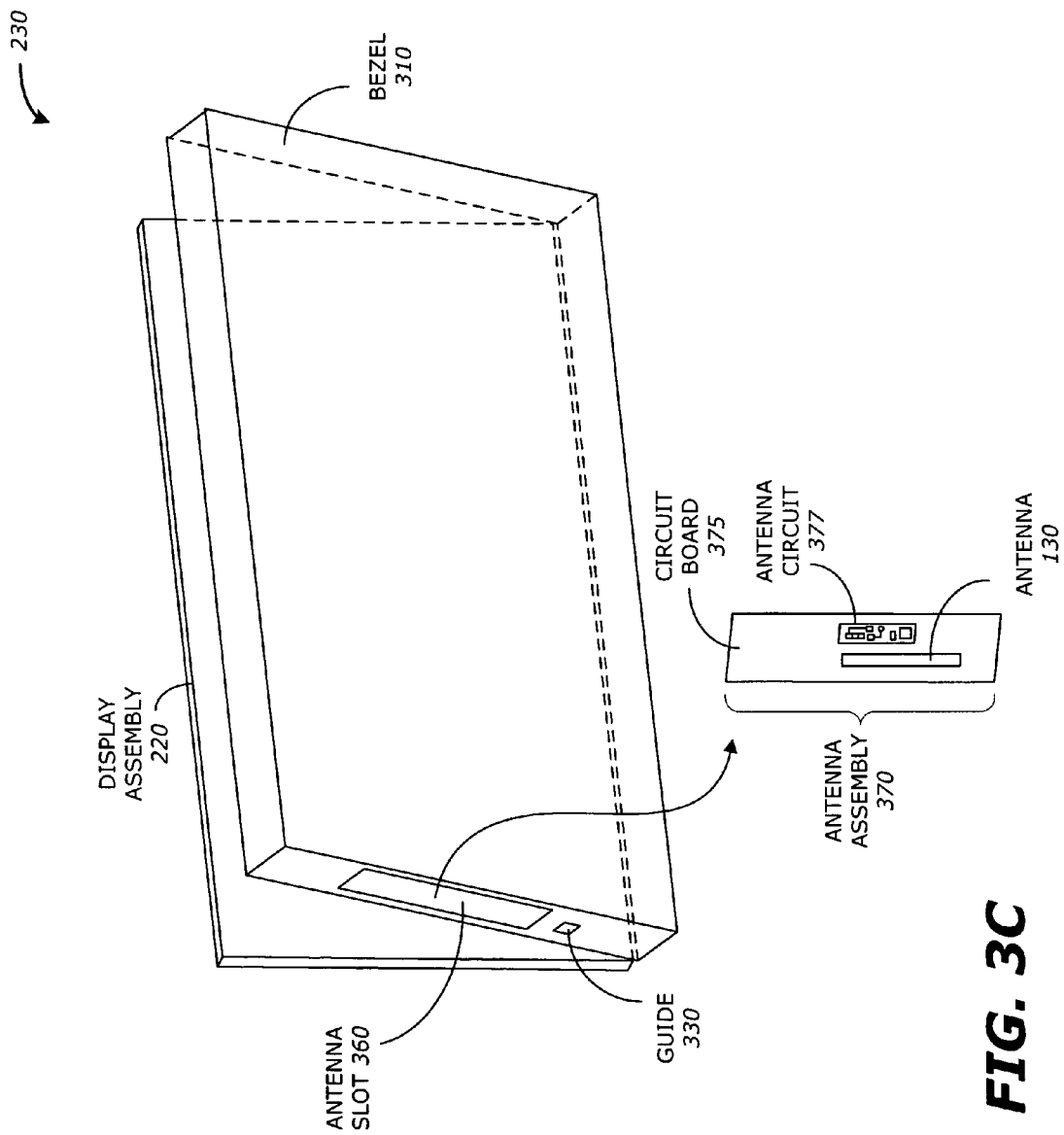
FIG. 3C is a diagram illustrating a bezel assembly with an antenna assembly according to one embodiment of the invention.

FIG. 3C is a diagram illustrating the bezel assembly 230 shown in FIG. 2 with an antenna assembly according to one embodiment of the invention.

The bezel assembly 230 includes the removable bezel 310 as described in FIG. 3A. The removable bezel 310 includes an antenna slot 360 and the guide 330. The antenna slot 360 provides a housing for an antenna assembly 370. The antenna slot 260 may be a hollow space at a pre-determined location on the removable bezel 310. It may be sized to accommodate the antenna assembly 370 such that the antenna assembly 370 may be hidden within the bezel assembly 230. The antenna slot 260 may have an attachment mechanism so that the antenna assembly 370 may be snapped in to be firmly secured in the bezel assembly 230. The attachment mechanism may be any suitable mechanism such as a clip, a holder, a snap-in port, etc.

The antenna assembly 370 includes a circuit board 375, the antenna 130, and an optional antenna circuit 377. The antenna 130 may be integrated or embedded as part of the circuit board 375. For example, it may be constructed by copper etching on the circuit board 375. The circuit board 375 may provide mechanical support and signal traces to route signals connecting the antenna and RF circuit, either in the RF communication circuit 240 or the antenna circuit 377. The antenna circuit 377 may include circuits for a complete wireless receiver, or circuit to interface to the RF communication circuit 240 in the CE device 110. The guide 330 guides or allows interconnection cables or wires to go through to connect the antenna to the RF communication circuit 240 (FIG. 2) inside the CE device 110 as described in FIG. 3A.

Figure 4A:
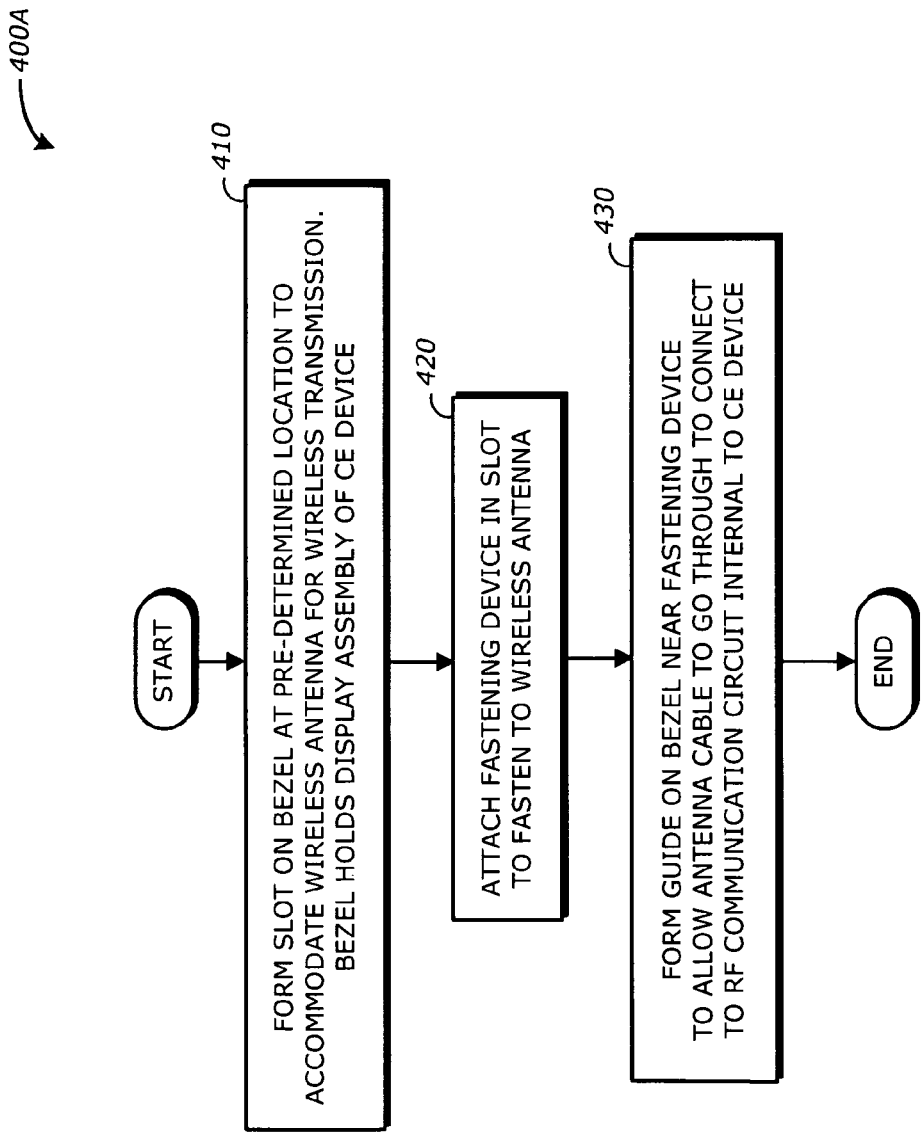
FIG. 4A is a flowchart illustrating a process to construct an antenna attachment mechanism according to one embodiment of the invention.

FIG. 4A is a flowchart illustrating a process 400A to construct the antenna attachment mechanism 320 shown in FIG. 3 according to one embodiment of the invention.

Upon START, the process 400A forms a slot on a removable bezel at a predetermined location to accommodate a wireless antenna for a wireless transmission (Block 410). The removable bezel secures a display assembly of a CE device. Next, the process 400A attaches a fastening device in the slot to fasten the wireless antenna (Block 420). The fastening device may be a clip, a receptacle, a connector, a socket, or a mounting bracket that is designed to fit to the wireless antenna.

Then, the process 400A forms a guide on the removable bezel near the fastening device to allow antenna cable to go through to connect to a RF communication circuit internal to the CE device (Block 430). The guide may be inside the slot and located within a short distance (e.g. less than one inch) from the fastening device. The process 400A is then terminated.

Figure 4B:
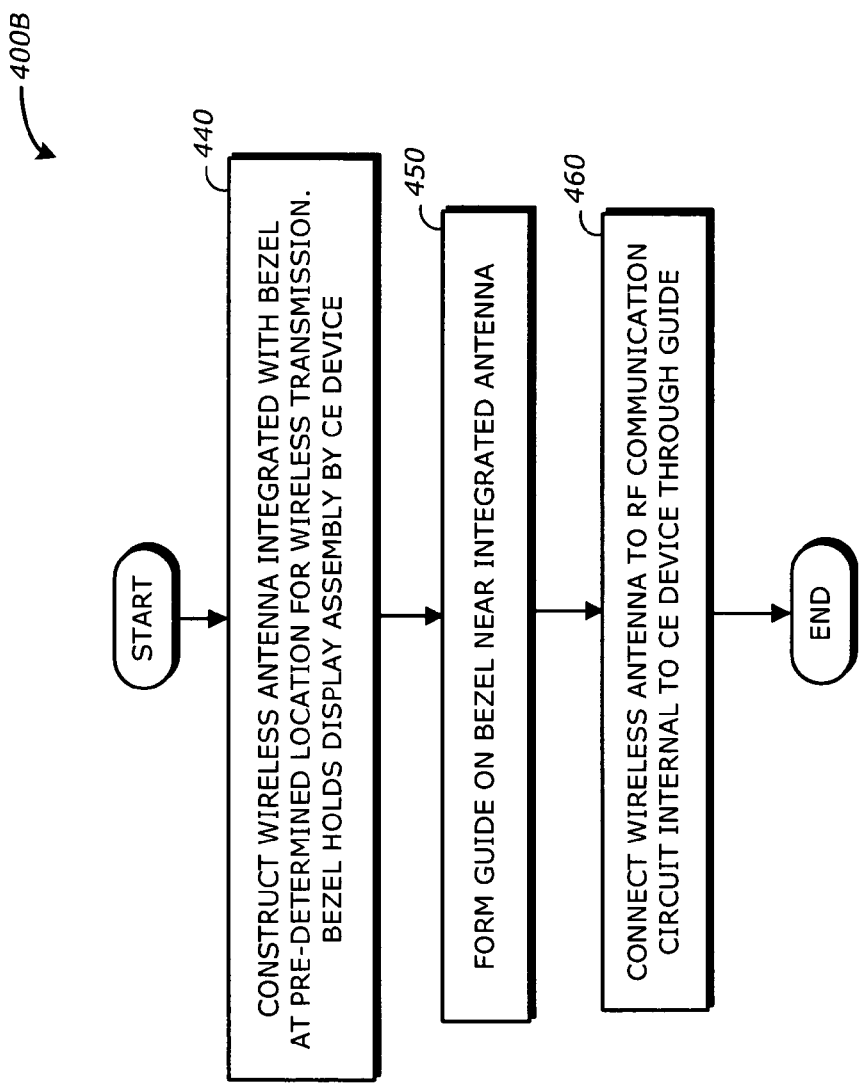
FIG. 4B is a flowchart illustrating a process to form a bezel with an integrated antenna according to one embodiment of the invention.

FIG. 4B is a flowchart illustrating a process 400B to form a bezel with an integrated antenna according to one embodiment of the invention.

Upon START, the process 400B constructs a wireless antenna integrated with a removable bezel at a pre-determined location for a wireless transmission (Block 440). The bezel holds a display assembly of a CE device. The wireless antenna is essentially molded directly within the bezel and is a part of the bezel. Then, the process 400B forms a guide on the bezel near the integrated wireless antenna (Block 450). Next, the process 400B connects the wireless antenna to an RF communication circuit internal to the CE device (Block 460). The process 400B is then terminated.

FIG. 4C is a flowchart illustrating a process 400C to form a bezel assembly with an antenna assembly according to one embodiment of the invention.

Upon START, the process 400C attaches an antenna assembly to a removable bezel at a pre-determined location (Block 470). The antenna assembly has a wireless antenna. The removable bezel holds a display assembly of a CE device. Then, the process 400C forms a guide on the bezel near the antenna assembly (Block 480). Next, the process 400C connects the wireless antenna to a RF communication circuit internal to the CE device for a wireless transmission through the guide (Block 490). The process 400C is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a removable bezel to hold a display assembly of a consumer electronics (CE) device; and
   an antenna attachment mechanism integrated to the removable bezel at a pre-determined location to allow connection to a radio frequency (RF) communication circuit internal to the CE device, the antenna attachment mechanism being adapted for attachment to a wireless antenna used in a wireless transmission;
   wherein the antenna attachment mechanism comprises:
   a slot shaped to accommodate the wireless antenna; and
   a fastening device secured to the pre-determined location in the slot to provide a snap-in action to attach to the wireless antenna.

2. The apparatus of claim 1 wherein the pre-determined location is one of top, underside, or vertical side of the removable bezel.

3. The apparatus of claim 1 wherein the wireless transmission is compatible to one of Institute Electronics and Electrical Engineers (IEEE) 802.11a, 802.11b, 802.11g, 802.11j, 802.11n, ultra wideband (UWB), or millimeter wave standards.

4. The apparatus of claim 1 wherein the CE device is a display device, a television, a liquid crystal display (LCD) device, a flat panel display device, a computing device, a game console, or a multimedia device.

5. An apparatus comprising:
   a removable bezel to hold a display assembly of a consumer electronics (CE) device; and
   an antenna attachment mechanism integrated to the removable bezel at a pre-determined location to allow connection to a radio frequency (RF) communication circuit internal to the CE device, the antenna attachment mechanism being adapted for attachment to a wireless antenna used in a wireless transmission;
   wherein the removable bezel has a guide located near the antenna attachment mechanism to allow antenna cable to go through to connect to the RF communication circuit.

6. The apparatus of claim 5 wherein the pre-determined location is one of top, underside, or vertical side of the removable bezel.

7. The apparatus of claim 5 wherein the wireless transmission is compatible to one of Institute Electronics and Electrical Engineers (IEEE) 802.11a, 802.11b, 802.11g, 802.11j, 802.11n, ultra wideband (UWB), or millimeter wave standards.

8. The apparatus of claim 5 wherein the CE device is a display device, a television, a liquid crystal display (LCD) device, a flat panel display device, a computing device, a game console, or a multimedia device.

9. An apparatus 7 comprising:
   a removable bezel to hold a display assembly of a consumer electronics (CE) device; and
   a wireless antenna integrated within the removable bezel at a pre-determined location, the wireless antenna being coupled to a radio frequency (RF) communication circuit internal to the CE device for a wireless transmission;
   wherein the removable bezel has a guide located near the wireless antenna to allow antenna cable to go through to connect to the RF communication circuit.

10. The apparatus of claim 9 wherein the pre-determined location is one of top, underside, or vertical side of the removable bezel.

11. The apparatus of claim 9 wherein the wireless transmission is compatible to one of Institute Electronics and Electrical Engineers (IEEE) 802.11a, 802.11b, 802.11g, 802.11j, 802.11n, ultra wideband (UWB), or millimeter wave standards.

12. The apparatus of claim 9 wherein the CE device is a display device, a television, a liquid crystal display (LCD) device, a flat panel display device, a computing device, a game console, or a multimedia device.

13. An apparatus comprising:
    a removable bezel to hold a display assembly of a consumer electronics (CE) device; and
    an antenna assembly attached to the removable bezel at a pre-determined location, the antenna assembly having a wireless antenna being coupled to a radio frequency (RF) communication circuit internal to the CE device for a wireless transmission;
    wherein the removable bezel has a guide located near the antenna assembly to allow antenna cable to go through to connect to the RF communication circuit.

14. The apparatus of claim 13 wherein the pre-determined location is one of top, underside, or vertical side of the removable bezel.

15. The apparatus of claim 13 wherein the wireless transmission is compatible to one of Institute Electronics and Electrical Engineers (IEEE) 802.11a, 802.11b, 802.11g, 802.11j, 802.11n, ultra wideband (UWB), or millimeter wave standards.

16. The apparatus of claim 13 wherein the CE device is a display device, a television, a liquid crystal display (LCD) device, a flat panel display device, a computing device, a game console, or a multimedia device.

17. A method comprising:
    forming a slot on a removable bezel at a predetermined location to accommodate a wireless antenna for a wireless transmission, the removable bezel holding a display assembly of a consumer electronics (CE) device; and
    attaching a fastening device in the slot to fasten the wireless antenna.

18. The method of claim 17 further comprising:
    forming a guide on the removable bezel near the fastening device to allow antenna cable to go through to connect to a radio frequency (RF) communication circuit internal to the CE device.

19. The method of claim 17 wherein the wireless transmission is compatible to one of Institute Electronics and Electrical Engineers (IEEE) 802.11a, 802.11b, 802.11g, 802.11j, 802.11n, ultra wideband (UWB), or millimeter wave standards.

20. The method of claim 17 wherein the CE device is a display device, a television, a liquid crystal display (LCD) device, a flat panel display device, a computing device, a game console, or a multimedia device.

21. The method of claim 17 wherein the pre-determined location is one of top, underside, or vertical side of the removable bezel.

22. A method comprising:
constructing a wireless antenna integrated within a removable bezel at a pre-determined location, the removable bezel holding a display assembly of a consumer electronics (CE) device;
connecting the wireless antenna to a radio frequency (RF) communication circuit internal to the CE device for a wireless transmission; and
forming a guide on the removable bezel near the wireless antenna to allow antenna cable to go through to connect to the RF communication circuit internal to the CE device.

23. The method of claim 22 wherein the pre-determined location is one of top, underside, or vertical side of the removable bezel.

24. The method of claim 22 wherein the wireless transmission is compatible to one of Institute Electronics and Electrical Engineers (IEEE) 802.11a, 802.11b, 802.11g, 802.11j, 802.11n, ultra wideband (UWB), or millimeter wave standards.

25. The method of claim 22 wherein the CE device is a display device, a television, a liquid crystal display (LCD) device, a flat panel display device, a computing device, a game console, or a multimedia device.

26. A method comprising:
attaching an antenna assembly having a wireless antenna to a removable bezel at a pre-determined location, the removable bezel holding a display assembly of a consumer electronics (CE) device;
connecting the wireless antenna to a radio frequency (RF) communication circuit internal to the CE device for a wireless transmission; and
forming a guide on the removable bezel near the antenna assembly to allow antenna cable to go through to connect to the RF communication circuit internal to the CE device.

27. The method of claim 26 wherein the pre-determined location is one of top, underside, or vertical side of the removable bezel.

28. The method of claim 26 wherein the wireless transmission is compatible to one of Institute Electronics and Electrical Engineers (IEEE) 802.11a, 802.11b, 802.11g, 802.11j, 802.11n, ultra wideband (UWB), or millimeter wave standards.

29. The method of claim 26 wherein the CE device is a display device, a television, a liquid crystal display (LCD) device, a flat panel display device, a computing device, a game console, or a multimedia device.

30. A system comprising:
a wireless receiver/transmitter to receive or transmit wireless signals in a wireless transmission;
a wireless antenna to transmit or receive the wireless signals to or from the wireless receiver/transmitter; and
a consumer electronics (CE) device located from a distance from the wireless receiver/transmitter, the CE device having a radio frequency (RF) communication circuit, a display assembly and a bezel assembly, the bezel assembly comprising:
a removable bezel to hold the display assembly, and
an antenna attachment mechanism integrated to the removable bezel at a pre-determined location to allow connection to the RF communication circuit internal to the CE device, the antenna attachment mechanism being adapted for attachment to the wireless antenna used in the wireless transmission;
wherein the antenna attachment mechanism comprises:
a slot shaped to accommodate the wireless antenna; and
a fastening device secured to the pre-determined location in the slot to provide a snap-in action to attach to the wireless antenna.

31. The system of claim 30 wherein the pre-determined location is one of top, underside, or vertical side of the removable bezel.

32. The system of claim 30 wherein the wireless transmission is compatible to one of Institute Electronics and Electrical Engineers (IEEE) 802.11a, 802.11b, 802.11g, 802.11j, 802.11n, ultra wideband (UWB), or millimeter wave standards.

33. The system of claim 30 wherein the CE device is a display device, a television, a liquid crystal display (LCD) device, a flat panel display device, a computing device, a game console, or a multimedia device.

34. A system comprising:
a wireless receiver/transmitter to receive or transmit wireless signals in a wireless transmission;
a wireless antenna to transmit or receive the wireless signals to or from the wireless receiver/transmitter; and
a consumer electronics (CE) device located from a distance from the wireless receiver/transmitter, the CE device having a radio frequency (RF) communication circuit, a display assembly and a bezel assembly, the bezel assembly comprising:
a removable bezel to hold the display assembly, and
an antenna attachment mechanism integrated to the removable bezel at a pre-determined location to allow connection to the RF communication circuit internal to the CE device, the antenna attachment mechanism being adapted for attachment to the wireless antenna used in the wireless transmission;
wherein the removable bezel has a guide located near the antenna attachment mechanism to allow antenna cable to go through to connect to the RF communication circuit.

35. The system of claim 34 wherein the pre-determined location is one of top, underside, or vertical side of the removable bezel.

36. The system of claim 34 wherein the wireless transmission is compatible to one of Institute Electronics and Electrical Engineers (IEEE) 802.11a, 802.11b, 802.11g, 802.11j, 802.11n, ultra wideband (UWB), or millimeter wave standards.

37. The system of claim 34 wherein the CE device is a display device, a television, a liquid crystal display (LCD) device, a flat panel display device, a computing device, a game console, or a multimedia device.

* * * * *